(12) United States Patent
Holt

(10) Patent No.: US 10,417,015 B2
(45) Date of Patent: Sep. 17, 2019

(54) MODIFIED JVM WITH MULTI-TENANT APPLICATION DOMAINS AND CLASS DIFFERENTIATION

(71) Applicant: Waratek Limited, Dublin (IE)

(72) Inventor: John Matthew Holt, Dublin (IE)

(73) Assignee: Waratek Limited (IE)

( * ) Notice: Subject to any disclaimer, the term of this patent is extended or adjusted under 35 U.S.C. 154(b) by 0 days.

(21) Appl. No.: 15/715,924

(22) Filed: Sep. 26, 2017

(65) Prior Publication Data

US 2018/0018188 A1   Jan. 18, 2018

Related U.S. Application Data

(63) Continuation of application No. 15/053,208, filed on Feb. 25, 2016, now Pat. No. 9,798,558, which is a continuation-in-part of application No. 14/398,031, filed as application No. PCT/AU2013/000435 on Apr. 30, 2013.

(30) Foreign Application Priority Data

Apr. 30, 2012   (AU) ................................ 2012901749

(51) Int. Cl.
| | |
|---|---|
| G06F 9/44 | (2018.01) |
| G06F 9/445 | (2018.01) |
| G06F 12/02 | (2006.01) |
| G06F 9/455 | (2018.01) |
| G06F 9/54 | (2006.01) |

(52) U.S. Cl.
CPC ...... *G06F 9/44521* (2013.01); *G06F 9/45504* (2013.01); *G06F 9/54* (2013.01); *G06F 12/0253* (2013.01); *G06F 2212/1044* (2013.01)

(58) Field of Classification Search
None
See application file for complete search history.

(56) References Cited

U.S. PATENT DOCUMENTS

| | | | | |
|---|---|---|---|---|
| 6,457,142 B1* | 9/2002 | Klemm | ............... | G06F 11/3476 714/38.12 |
| 8,863,093 B1* | 10/2014 | Chou | .................. | G06F 9/45504 717/124 |
| 2008/0216063 A1* | 9/2008 | Krasnoiarov | ....... | G06F 9/45516 717/146 |
| 2015/0113545 A1* | 4/2015 | Holt | .................... | G06F 9/44521 719/328 |

* cited by examiner

*Primary Examiner* — Craig C Dorais
(74) *Attorney, Agent, or Firm* — Design IP

(57) ABSTRACT

A method and system for operating a modified Java Virtual Machine (JVM) which is able to simultaneously host multiple Java application programs is disclosed. In a first modification the JVM is modified to permit multiple class definitions of some of the Java Application Programming Interface (API) classes, so called non-sensitive classes, to be loaded multiple times but restrict other Java API classes, so called sensitive classes, to be loaded only once, preferably onto a bootstrap class loader. In a second modification the Java API classes are also modified. Preferably in a further modification, some or all of the sensitive API classes are modified not to use synchronization.

15 Claims, 6 Drawing Sheets

| APPLICATION PROGRAM #1 | | APPLICATION PROGRAM #2 | |
|---|---|---|---|
| OPERATING SYSTEM #1 | | OPERATING SYSTEM #2 | |
| VIRTUAL MACHINE #1 | | VIRTUAL MACHINE #2 | |
| CPU #1 | CPU #2 | CPU #3 | CPU #4 |

FIG. 5

PRIOR ART

| Java Application Program #1 | | Java Application Program #2 | | Java Application Program #3 |
|---|---|---|---|---|
| Java Virtual Machine #1 | | Java Virtual Machine #2 | | Java Virtual Machine #3 |
| OPERATING SYSTEM | | | | |
| CPU #1 | CPU #2 | CPU #3 | | CPU #4 |

FIG. 6

PRIOR ART

| Java Application Program #1 | Java Application Program #2 | Java Application Program #3 |
|---|---|---|
| Java Virtual Machine ||| 
| OPERATING SYSTEM |||
| CPU #1 | CPU #2 | CPU #3 | CPU #4 |

FIG. 7

MODIFIED JVM WITH MULTI-TENANT APPLICATION DOMAINS AND CLASS DIFFERENTIATION

FIELD OF THE INVENTION

The present invention relates to the operation of services which host multiple application programs.

BACKGROUND OF THE INVENTION

Figure 1:
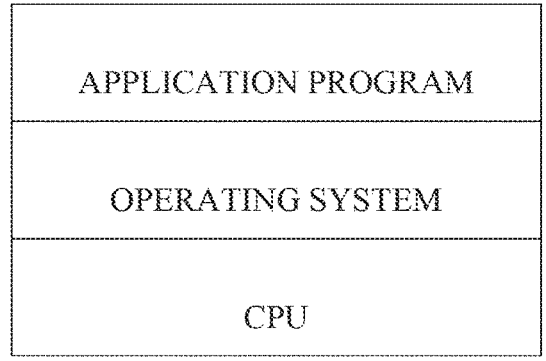
Figure 2:
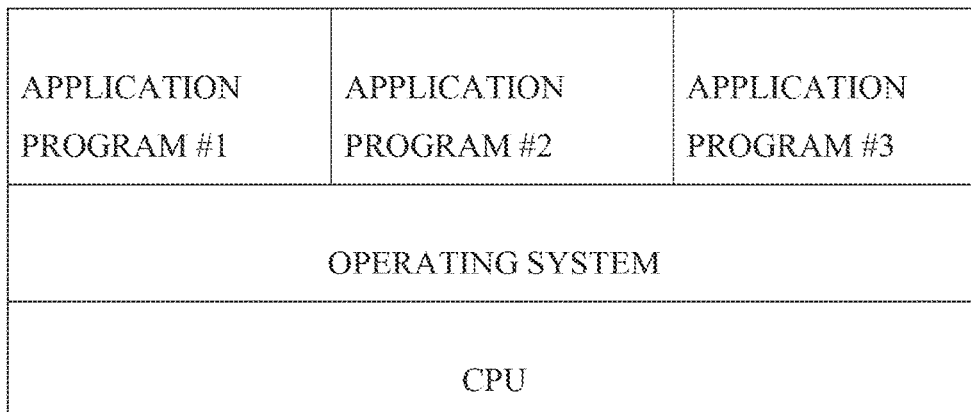
Figure 3:
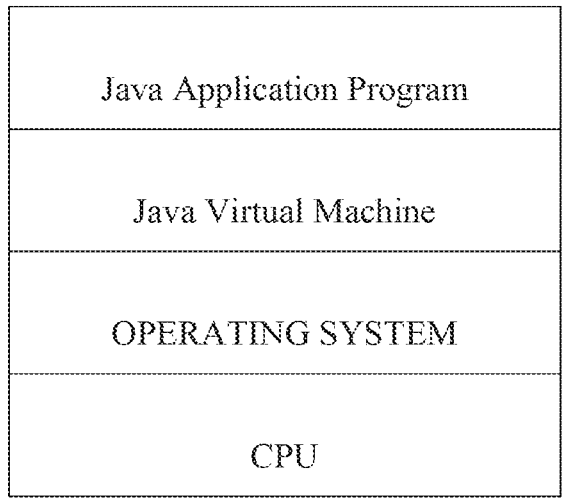
Figure 4:
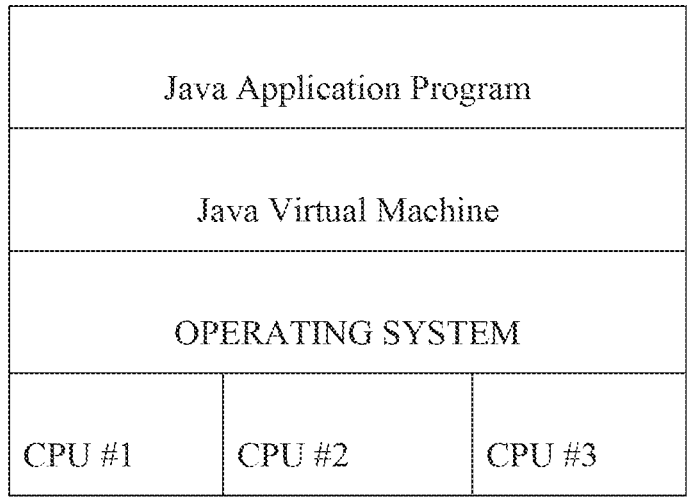

The prior art relevant to the present invention will now be described with reference to the accompanying drawings in which:

FIG. 1 is schematic diagram showing the operation of a conventional computer with a single CPU, FIG. 2 is a schematic diagram showing the operation of multiple application programs on a single CPU, FIG. 3 is a schematic diagram of an application virtual machine such as a JVM, FIG. 4 is a schematic diagram of a server computer with multiple CPUs operating a single JVM and a single application program, FIG. 5 is a schematic diagram of a server computer with multiple CPUs operating multiple JVMs each with a single application program FIG. 6 is a schematic diagram of a server computer with multiple CPUs operating multiple JVMs and a single operating system, FIG. 7 is a schematic diagram of a proposed server computer with multiple CPUs operating a single JVM and a single operating system but multiple application programs.

Figure 8:
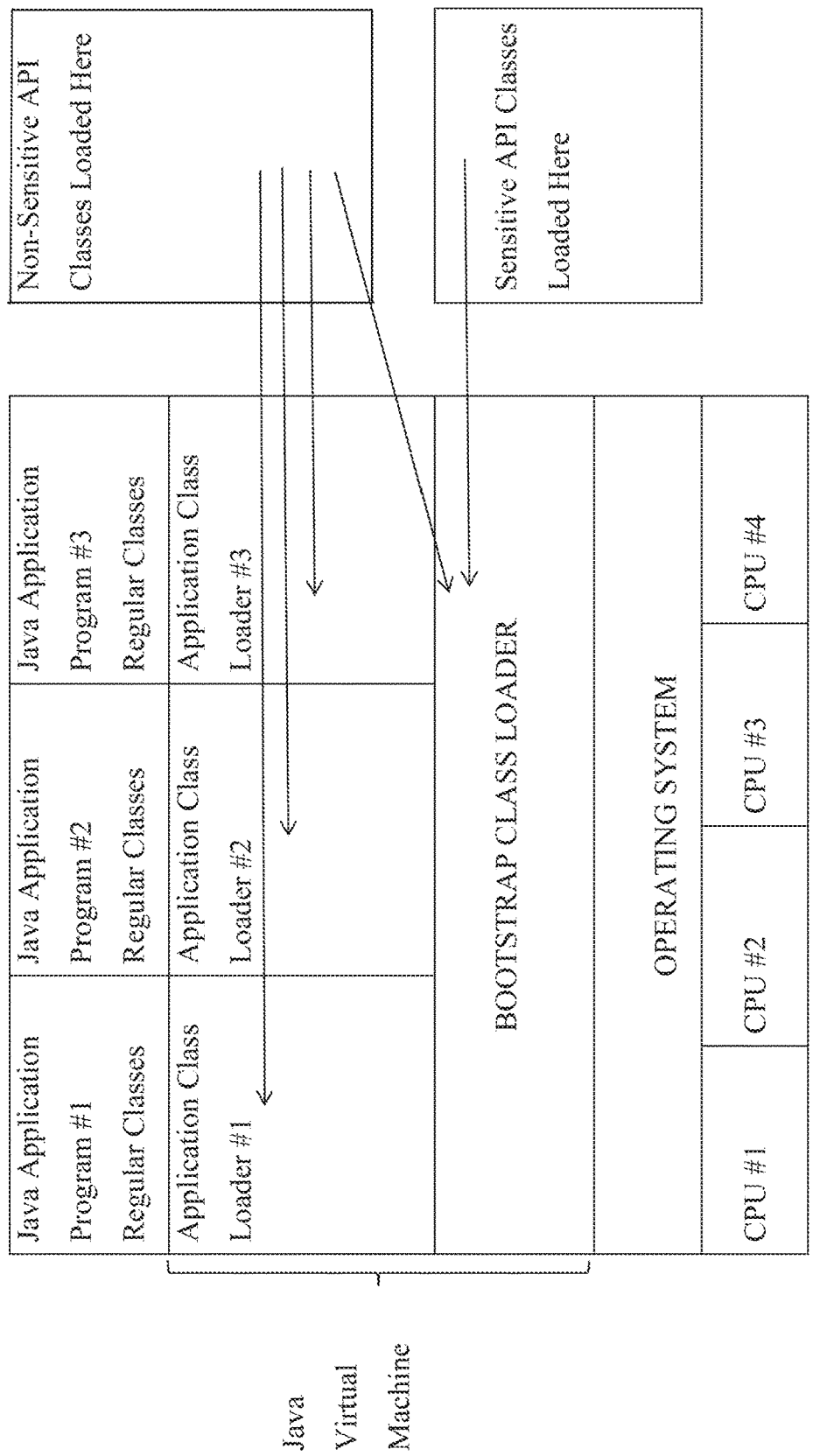
Figure 9:
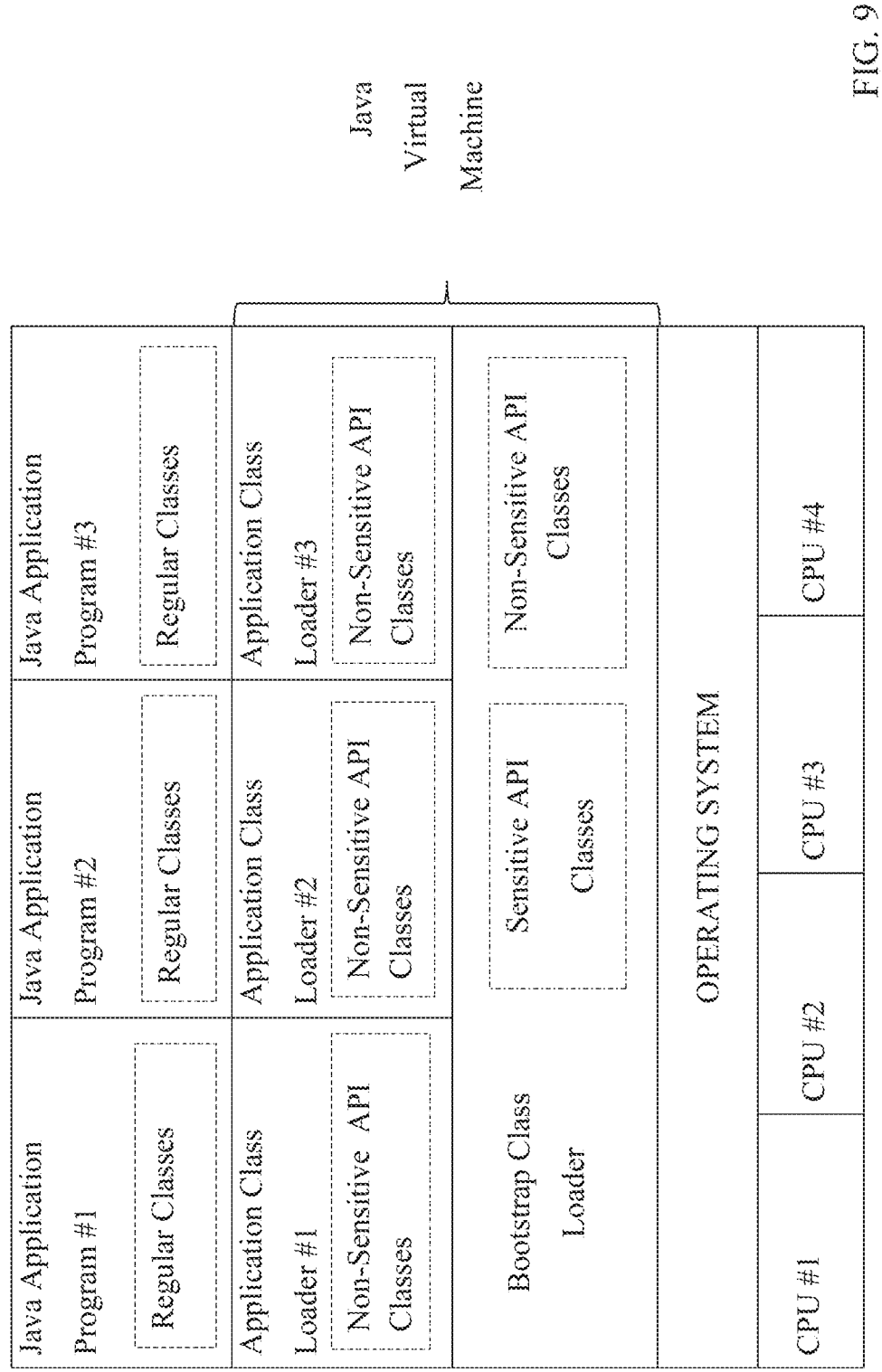

In addition, embodiments of the present invention will be described hereafter in relation to:

FIG. 8 which is a schematic representation of the loading or initialization of a server computer with multiple CPUs operating a single JVM and a single operating system but multiple application programs with high density, and FIG. 9 is the same representation but during operation of the multiple application programs.

A conventional computer has a central processing unit (CPU) which is managed by an operating system which is not apparent to the user of the computer. An application program runs on the computer utilizing both the operating system and the CPU. This conventional arrangement is illustrated in FIG. 1 and has been in operation for many years.

It is known to run several application programs on a single conventional computer by means of operating each application program successively for a short period. This is equivalent to a time divisional multiplex procedure and is illustrated in FIG. 2.

It has also been known for many years to operate an "application virtual machine" (see http://en.wikipedia.org/wiki/Application_virtual_machine#Process_virtual_machines) in which the application program is written in a language (eg. Java) which is itself incompatible with the operating system and/or CPU on which it is to be run. However, an application virtual machine such as a Java Virtual Machine (JVM) sits between the operating system and the application program. Thus, as far as the user of the application program is concerned, the computer operates in the Java language even though the CPU and the operating system do not use Java. An equivalent language to the Java language is the .Net language and unless the context specifically conveys an alternative meaning, references to the Java language herein include a reference to the .Net language this arrangement is illustrated in FIG. 3 and thus in FIG. 3 the labels "Java Application Program" and "Java Virtual Machine" should be construed as including equivalent labels ".Net Application Program" and ".Net Virtual Machine".

Some computers are designed specifically for hosting server applications like Database Management Systems (e.g. MySQL) and Web Server applications (like Apache Httpd), and these computers, called server computers, are designed with more than one CPU in order to operate the hosted application program(s) faster than is possible with a single CPU. Various plural CPU designs are known in the industry for operating multiple CPUs within a single server computer. Recent server computer designs incorporate 'nested' CPU configurations where one larger CPU device (microchip) comprises multiple built-in smaller CPUs called 'CPU cores'. Regardless of which multiple CPU arrangement is employed, each CPU or CPU core is available to the operating system software. FIG. 4 shows such a server computer configuration with multiple CPUs operating a single JVM and single Java application program.

In the late 1990's server virtualization arose as a means to address the phenomena of low server utilization rates that had arisen from a "one-application-program-per-server" model of the years prior. Server virtualization, such as provided by VMW are ESX and Citrix XenServer products today, made it possible to operate multiple independent operating systems on a single physical server, thereby increasing server utilization rates from the typical levels of 15% to far higher levels. This is illustrated in FIG. 5. The approach of multi-hosting several application programs on a single physical server using server virtualization techniques was termed "server consolidation", and proved successful in increasing server utilization rates for a number of application and workload cases. Server consolidation for legacy applications such as Database Management Systems (such as MySQL) and Web Server (such as Apache Httpd) applications has proven effective at increasing server utilization rates and reducing server infrastructure costs for these applications.

However, recently with this stratagem it has been recognized that Java language applications do not enjoy the same efficiency increases as applications written in other languages (e.g C, C++) when deployed on a shared server infrastructure. The reasons for this stem from the original design of the Java Platform, which imposed restrictions and limitations to efficiently hosting multiple Java applications on a single physical server environment.

The problem of hosting Java applications efficiently on shared server infrastructure has become further compounded by the rapid adoption of cloud computing environments as an application hosting option. Here, many independent Java applications from independent and mutually-distrusting customers are sought to be hosted by cloud computing vendors on shared physical server infrastructure. This is illustrated in FIG. 6. In this connection the term "distrusting" refers to the customer's desire to operate their application program in an isolated and secure environment from other unknown and potentially malicious application programs. Naturally, the cloud hosting vendor wishes to achieve as close to 100% server utilization as possible in order to increase the return on the purchased server infrastructure investment. In these cloud computing environments unused server capacity, whether it be unused CPU cycles or unused bytes of memory, represents a financial loss for the hosting provider as they do not earn revenue on these idle resources.

The inefficiencies of Java language application programs within shared server environments, and more recently in cloud computing environments, has been identified as a significant problem area for hosting providers seeking to achieve near 100% server utilization for their hosted workloads. The reasons for Java's inefficiencies stem from the design and nature of the Java Platform and the fundamentals of how modern Java Virtual Machines operate today. For example, the Java Platform includes within its design the use of "garbage" collection techniques for automating memory management of Java application programs by the deletion of memory records, classes, fields, objects, etc. which are no longer required for the operation of the application program. Garbage collection, however, places a considerable burden on the Java Virtual Machines that host Java applications, as inefficient garbage collection algorithms may significantly reduce the performance and usability of Java applications due to frequent disruptions to application execution and long pause times when garbage collection procedures are operating.

In an attempt to reduce the garbage collection overhead for Java applications, modern JVMs incorporate sophisticated garbage collection techniques based on parallel and concurrent collection algorithms which reduce pause-times and disruptions to executing Java applications. However, these contemporary parallel and concurrent garbage collection algorithms achieve this improvement through considerable consumption of CPU and memory resources of the underlying physical server.

For example, in modern concurrent garbage collection algorithms such as the "garbage first" algorithm, the JVM allocates at least one garbage collector thread to each physical CPU core available to the underlying operating system, pinning (or locking) each collector thread to a designated CPU (or CPU core) and then operating these threads concurrently with application execution. As a result, even when the Java application is itself idle, the JVM using a "garbage first" collector algorithm will have allocated enough threads to occupy all of the CPU cores available to the underlying operating system and will execute these collector threads concurrently in the background on all of the available CPU cores.

So long as only one JVM is operated at a time per operating system, then the JVM and the Java application are able to perform consistently at their peak possible performance. However, as is frequently the case with enterprise applications which experience periods of low computational load (such as may be experienced outside of business hours), cloud computing vendors and others who seek to host Java applications wish to be able to load multiple Java applications on shared physical server infrastructure. The inefficiencies of hosting Java applications on shared server infrastructure and cloud computing environments arises therefore when multiple independent Java applications running in multiple independent JVMs are attempted to be hosted on a single shared physical server and operating system.

For example, after starting the first JVM on a shared operating system, that JVM will typically allocate one garbage collector thread to each CPU core available to the operating system, and using contemporary garbage collection algorithms, will operate these threads on each CPU core concurrently with application execution. When a second JVM is then attempted to be started on the same physical server and operating system environment, problems begin to arise. As the second JVM starts it will, like the first JVM, allocate one garbage collector thread to each CPU core available to the underlying operating system. However, the first JVM has already done exactly the same thing. Therefore the situation is created where the two JVMs each have allocated enough threads to consume the available CPU cores. That is, each core has one garbage collector thread allocated to it from each JVM, but each JVM believes it has controlling use of that CPU core (which it not the case). Obviously as more simultaneous JVMs are started beyond two, this problem is proportionally compounded. Problematic behavior will begin to be observed therefore when the two or more JVMs begin performing garbage collection activities at the same time, as each JVM will compete with the other JVM (or other JVMs) to perform its background garbage collection duties on each CPU core. This creates a significant contention point on each CPU core caused by each JVM's threads competing with each other JVM's threads to perform their respective garbage collection and other Java Platform management duties, resulting in substantial CPU and memory load together with an all too apparent slow performance of the hosted Java applications.

GENESIS OF THE INVENTION

Thus this situation has led to the recognition that hosting plural Java applications on shared server infrastructure and cloud computing environments is significantly inefficient. The Genesis of the present invention is a desire to conceive of a more efficient mechanism for hosting Java applications on shared server infrastructure and cloud computing environments.

DETAILED ANALYSIS OF THE PRIOR ART

A number of approaches have been proposed for hosting multiple Java applications on shared server infrastructure more efficiently, by hosting these multiple applications within a single shared JVM. An illustration of such a desirable arrangement as this is shown in FIG. 7. If this were possible, then the inefficiencies of hosting multiple Java applications on a shared server infrastructure or cloud computing environment would be at least partially resolved. This is because a single JVM could be started for a given physical server and/or operating system and then multiple Java applications could be hosted within that single JVM. In this way, the single JVM could employ the latest parallel and concurrent garbage collection algorithms without concern about contention or competition with other JVM instances operating on the same shared operating system or physical server, as it would be the only JVM on that operating system/server device and could execute its garbage collection algorithms without interference from other competing JVMs.

Unfortunately, however, the Java Platform, comprising the Java Virtual Machine Specification, the Java Language Specification, and the Java Application Programming Interface (API) Specification, never contemplated hosting multiple independent standalone applications within a single shared JVM. When the Java Platform specifications were designed, the architects anticipated a one-application-per-JVM model, and the relevant specifications were defined accordingly.

For example, one of the Java API classes defined by the Java Platform specifications is the java.lang.System class. The java.lang.System class contains three publically-accessible field variables—namely in, out, and err, which may be set via the setIn( ), setOut( ), and setErr( ) methods respectively. The Java Platform specifications specify that only a single java.lang.System class may be loaded and defined per JVM, and therefore that only a single occurrence of these three field variables may exist per JVM. This creates a significant problem then when two applications are attempted to be operated within the same JVM at once, as each application will assume it controls the setup of the System.out/err/in field variables for its own use via the setIn( ), setOut( ), and setErr( ) functions. As the Java Platform specification restricts these field variables to only having one unique value each, only one of two (or more) Java applications attempting to operate concurrently within a single JVM will be able to control these singleton field variables for all applications; the other applications will be forced to use the in/out/err fields of the last controlling application that set them. This will potentially result in undefined and erroneous behavior for all applications, not merely one of the applications.

The java.lang.System class is only one example of many similarly restricted classes defined by the Java Platform specifications. Right throughout the Java Platform specifications there are requirements and restrictions which make it impractical for existing JVMs following the Java Platform specifications to host multiple applications wholly independently and simultaneously, without risking erroneous operation or security violations for one or all of the co-hosted applications. Nonetheless various strategies have been so far proposed to support co-hosted applications within a single shared JVM, each with limited success.

One such attempt to host multiple applications within a single JVM involves defining a restricted subset of the Java Platform specifications which is permitted for use in a multi-hosted configuration, and disallowing all other non-permitted operations and features of the Java Platform specifications which are not safe or secure for multi-tenant operation (for example that are not safe or secure when there are multiple independent application programs being hosted simultaneously). One example of this prior art approach is Google's AppEngine for Java, where a proprietary "JRE White List" is defined informing programmers and application developers what parts of the Java Platform specifications they are permitted to use on Google's AppEngine system, and which parts they are not permitted to use (see https://developers.google.com/appengine/docs/java/jre-whitelist). The abbreviation JRE stands for Java Runtime Enviroment. So long as application programmers restrict themselves to this reduced feature list, then Google AppEngine will be able to deploy their application in a multi-tenant JVM environment operated by Google. Unfortunately, however, such JRE White Lists impose very considerable limits of what Java applications are allowed to do in these multi-tenant environments, such as not being permitted to allocate new threads, or manipulate any Java environment variables (such as java.lang. System in/out/err field variables). As a result, proprietary restricted environments such as Google AppEngine have failed to achieve commercial success as application developers have shunned the limitations of these restricted proprietary environments and preferred instead the full range of features and flexibility provided by the complete and unfettered Java Platform specifications.

Another attempt is defined in the specification of U.S. Pat. No. 6,931,544 (Kienhoefer/The SCO Group, Inc) where extensive use of a security manager facility like the java.lang. SecurityManager class defined by the Java Platform specifications, is used to apply differing permissions and privileges to co-hosted applications operating within a single JVM. The description of the co-hosting technique of the U.S. Pat. No. 6,931,544 is explicitly directed for use with unmodified JVMs such as those JVMs provided by Sun Microsystems (now Oracle) and others (see column 3, line 56-59, and column 4, line 4-9 of the patent specification). U.S. Pat. No. 6,931,544 eschews modifying the underlying JVM or Java Platform specifications in favor of attempting to retrofit co-hosting support on top of existing unmodified JVMs and unmodified Java API classes. One such limitation of the Java Platform specifications, and existing unmodified JVMs and Java API classes which follow those specifications, is the inability to load multiple definitions of the Java API classes (what U.S. Pat. No. 6,931,544 calls "base classes"), such as java.lang. System and java.lang.Thread.

Given the goal to operate within the limitations of existing unmodified JVMs and Java API classes, the principal feature of the co-hosting framework proposed in U.S. Pat. No. 6,931,544 is a method for sharing of so-called "base classes" (Java API classes) between the multiple co-hosted applications (see column 4 line 20: "The base class overlays 200 provide support for multiple JAVA applications using only a single copy of the base class 102"). This is shown in FIG. 2 of U.S. Pat. No. 6,931,544 where Base Classes 102 and Base Class Overlays 200 are shown being singularly loaded by the single primordial class loader (also called a bootstrap class loader within the Java Platform specifications) and being shared with the multiple co-hosted applications 108 above.

U.S. Pat. No. 6,931,544 describes the use of so-called "overlays" to replace the problematic Java API classes (such as java.lang. System) which do not support multi-tenanted operation. In the technique described in U.S. Pat. No. 6,931,544, these overlay classes substitute the functionality of the original "base classes" through either a modification or replacement means. Superficially, the use of overlays as described in U.S. Pat. No. 6,931,544 appears to address some of the challenges in co-hosting multiple independent Java applications within a single JVM whilst operating with a single set of shared Java API classes ("base classes"). However, it does not in reality provide a robust solution to hosting multiple applications in a safe and secure manner such that one application cannot interfere with or disrupt the execution of a second neighboring application. This is a critical requirement for co-hosting Java applications on shared server infrastructure or cloud computing environments. Specifically, sharing Java API classes in the manner proposed in U.S. Pat. No. 6,931,544 introduces a variety of severe security and language vulnerabilities which undermine the feasibility of the U.S. Pat. No. 6,931,544 techniques for multi-tenant use in today's cloud computing and related environments.

For example, the JVM specification defines a technique for performing multithreaded synchronization using either the paired MONITORENTER and MONITOREXIT instructions, or the use of the 'synchronized' modifier in method declarations. The effect of using synchronization through either of these means is to provide a serial execution guarantee such that only one thread at a time can execute a body of code guarded by the synchronization declaration. The Java Platform specifications permit the use of either of these synchronization operations on both java.lang.Object types and java.lang.Class types. Numerous API classes within the Java Platform specifications rely on synchronization of class or instance types to implement their desired actions correctly. For example, the java.lang.Thread.join( ) function as implemented in the OpenJDK Java 6 source code is a synchronized method. As a result, only one executing thread may execute the body of a given java.lang. Thread object's "join" function at once, thereby blocking all other concurrently executing threads from executing join or related functions for the duration of the period during which the earlier caller 'owns' the concerned synchronization monitor.

Thus an opportunity arises for a malicious (or merely incompetent) co-hosted application program to perform a denial-of-service attack against other co-hosted applications operating within the same JVM when using shared Java API classes in the manner taught in the U.S. Pat. No. 6,931,544 arrangement. Appendix A shows the Java code from the java.sql.DriverManager class of the OpenJDK Java 6 source code. Note the use of the "synchronized (DriverManager.class)" statement in the function getDriver (String url). Here, the getDriver( ) function uses synchronization on the java.sql.DriverManager class object in line 248 to ensure thread safety while attempting to read the list of SQL database drivers available on the system.

In normal circumstances where only a single application program is operating within a single JVM, this code is safe for use as is. However in the arrangement proposed in U.S. Pat. No. 6,931,544 where Java API classes are shared (see column 5, lines 9-11), a maliciously-intended (or poorly written) application program being co-hosted in a JVM with some other independent application program could, being aware of this code within the java.sql.DriverManager class, perform a synchronization of its own on the java.sql.DriverManager class object and then not exit the synchronized block it has created (such as for example by executing an infinite loop within the synchronization block guarding the java.sql.DriverManager class object). The consequence of this for all other co-hosted applications within the same JVM would be severe. All other applications would be obstructed from being able to use the javasql.DriverManager.getDriver( ) function and would therefore be obstructed from being able to use and access SQL database management services of the Java API classes. Clearly such a situation as this is a gross breach of platform security and safety and is wholly unsuitable for use within shared infrastructure or cloud computing environments, like Amazon EC2, where diverse and "untrusted" applications are sought to be simultaneously operated side-by-side within a single shared physical computer system and single shared JVM.

By no means is java.sql.DriverManager an isolated example, up to a thousand Java API classes within the OpenJDK Java 6 source code are at risk of similar denial-of-service attacks as that described above for DriverManager when using the co-hosting technique of U.S. Pat. No. 6,931,544 to share Java API classes between co-hosted applications. Clearly this is not acceptable for hosting multiple mutually-distrusting applications within cloud computing and shared server infrastructure environments where the co-hosted applications cannot "trust" their co-hosted neighboring applications to operate reasonably and safely. Thus, like the JRE White List approach operated by Google AppEngine, the co-hosting technique of U.S. Pat. No. 6,931,544 cannot provide a safe and secure framework for multi-tenant Java solutions seeking to concurrently host multiple mutually-distrusting applications side-by-side within a single shared JVM.

Unlike the co-hosting framework proposed in U.S. Pat. No. 6,931,544 where a single set of Java API classes are shared between co-hosted applications, or the restricted JRE White List design of Google AppEngine, the present invention discloses an arrangement that substantially overcomes the restrictions and security vulnerabilities of these previous approaches.

Java Language

Various computer programs are used throughout the world and these include Fortran, Cobol, C++ and Java. The Java language is an object oriented language and provides automatic background garbage collection. The Java language is intended to enable the same code to operate on computers manufactured by different manufacturers and this has given rise to the concept of the Java Virtual Machine (JVM).

The Java Virtual Machine Specification, the Java Language Specification, and the Java Application Programming Interface (API) Specification, together constitute the Java Platform Specification. All these specifications are published by the Independent and not-for-profit Java Community Process organization which was established in 1998. This publication constitutes an historical document, the contents of which do not change. These specifications define an exact abstract machine format, an exact object-code format, and an exact application programming interface collection which are mandatorily required for all compatible and compliant implementations of these specifications. The use of the term "Java" in relation to the Java computer language is used to describe this commercially available language and differentiate it from other commercially available computer languages such as C+.

The trade mark JAVA is owned by Oracle America, Inc. and is protected by U.S. Pat. Nos. 2,178,784; 2,298,389 and 3,681,468, inter-alia.

When a user purchases a copy of the Java computer language, the user receives programming tools which enable "regular classes" to be created and manipulated by the user. A regular class is any class which is not a member of the packages "java", "javax", "sun", or "com.sun". In addition, the user receives Java Application Programming Interface (API) classes which are specific to the Java language and which the user is not able to manipulate or violate in any way. The API classes remain unchanged irrespective of what the user does in writing or operating the application program.

However, the modified Java Virtual Machine produced in accordance with the preferred embodiments of the present invention makes two modifications to the API classes. The first modification is to divide the conventional or pre-existing API classes into two sets or groups. The first set is termed Sensitive API classes and the second set is termed Non-Sensitive API Classes. The second modification is to add API classes which are new to the Java language.

Importantly, in the modified Java Virtual Machine produced in accordance with preferred embodiments of the present invention, multiple application programs run independently on the JVM, many regular classes and many non-sensitive API classes are loaded into the JVM, but only one of each of the Sensitive API Classes is loaded into the JVM.

When a user purchases the modified JVM from the applicant of the present application, the user does not receive any regular classes, only the tools to create these, but the user does receive both the Non-Sensitive API Classes, and the Sensitive API Classes including those added API classes which are new to the Java language.

The use of the terms "Java API classes" and "Java API class" are to be understood to mean either classes (such as java.lang.Object) defined by the Java Platform specifications, or classes defined as part of the java.* package namespace such as for example java.lang.Throwable, java.util.HashMap, and java.io.FileSystem.

The use of the term "class definition" is to be understand to mean a class type represented by a unique java.lang.Class instance, such as may be created by java.lang.ClassLoader.defineClass(String name, byte[ ] buffer, int offset, int length) and related methods, or by a bootstrap class loader.

More than one class definition may be loaded for an identically named class (e.g. org.example.ClassA), resulting in multiple unique java.lang.Class instances, one for each class definition. Two class definitions which share the same name (for example as reported by the java.lang.Class.getName( ) method) are unique and not the same class definition if their respective java.lang.Class references are not equal, such as may be determined through the Java operations "org.example.ClassA.class !=org.example.ClassA.class" or "new org.example.ClassA( ).getClass( )!=new org.example.ClassA( ).getClass( )" or "instanceOneOfClassA.equals(instanceTwoOfClassA)==false". Different class definitions with the same name are not required to be identical, or be defined with identical bytecode, or have the same number and composition of methods, fields, and constructors.

The use of the term "bootstrap class loader" is to be understood to mean either a bootstrap or primordial class loader as described within the Java Platform specifications, or any other class loader where some or all of the classes defined by that class loader return "null" to the java.lang.Class.getClassLoader( ) method of the said classes.

The use of the term "application class loader" is to be understood to mean either a user-defined class loader as described within the Java Platform specification, or any class loader where some or all of the classes defined by that class loader do not return "null" to the java.lang.Class.getClassLoader( ) method of the said classes.

The use of the term "JVM" herein is to be understood to mean a Java Virtual Machine comprising an implementation of the Java Virtual Machine Specification and related set of Java API classes. In some JVMs, the Java API classes may be separately developed or maintained and only linked with the JVM at operating time (runtime). For the purposes of this specification, it is to be understood that the term "JVM" is inclusive of such runtime-linked Java API classes, regardless of whether some or all of these Java API classes are maintained separately from the rest of the JVM. Examples of existing JVMs include the OpenJDK JVM, the Oracle HotSpot JVM, the Oracle JRocket JVM, the IBM J9 JVM, the JikesRVM, the Maxine JVM, and the Waratek DRLVM.

SUMMARY OF THE DISCLOSURE

A modified JVM is described which is able to simultaneously operate multiple independent Java applications within a single executing JVM instance in a safe and secure manner. The modified JVM arrangement taught in the present specification overcomes the denial-of-service attack potential of U.S. Pat. No. 6,931,544, as well as provides a segregated application domain for each co-hosted application which does not curtail the hosted application's functionality through "JRE White Lists" or similar. In this way, multiple independent application programs co-hosted within a JVM equipped with the features of this specification are able to operate in a safe and secure manner and use all standard features of the Java Platform specifications in a complete and unfettered manner.

For each application to be concurrently hosted within a single shared JVM, a unique and isolated application domain is created which defines the operating environment for the contained application program. Within each application domain, the contained application program observes an execution environment that conforms without restriction to the Java Platform specifications and which is protected against interference or attacks from malicious or incompetent neighboring applications.

In order to achieve these goals, a JVM and/or related Java API classes are modified through a number of improvements. Through a first modification, the JVM and/or the related Java API classes are modified so that they may load or define multiple class definitions of the Java API classes. A typical JVM such as the OpenJDK Java 6 JVM and Java API classes will fail to load or define multiple class definitions of the Java API classes per single JVM instance by throwing an error or exception such as java.lang.SecurityException. In accordance with the preferred embodiment of this invention, such an existing JVM is modified to overcome this limitation by modifying the operation of the java.lang.ClassLoader class to support loading multiple class definitions of Java API classes within the java.* package namespace by either removing existing check conditions which disallow such operations, or by suppressing the error or exception actions that normally occur when attempting to load plural class definitions of Java API classes. Depending on the particular JVM being modified, similar modifications as made to the java.lang.ClassLoader class may be required within the JVM source code (such as C/C++ source code of the JVM) to enable loading plural class definitions of Java API classes within the java.* package namespace.

While modifying the JVM to load multiple class definitions of the Java API classes in this way goes partly towards addressing the denial-of-service attack potential of U.S. Pat. No. 6,931,544, a small number of Java API classes may not readily be able to be loaded multiple times (have multiple class definitions), or be loaded by application class loaders, without introducing significant difficulties for the JVM's operation. These classes, which are conveniently termed "sensitive classes", include such Java API classes as the java.lang.Object and java.lang.Class classes. Often such sensitive classes will be the core classes relied on by the JVM to operate, such as java.lang.Object and java.lang.Class, and therefore loading two or more class definitions for these classes' leads to inconsistent and erroneous operation of the JVM. Appendix B shows a larger list of Java API classes which are sensitive classes for some JVMs.

Given the inability of many JVMs to support multiple class definitions for certain Java API classes, it is necessary to undertake a second modification of the JVM and related Java API classes to differentiate sensitive classes and non-sensitive classes so that sensitive classes are loaded or defined once per JVM, preferably using a designated or predetermined class loader for that purpose, while non-sensitive classes are loaded multiple times per JVM using either or both of bootstrap class loaders and application class loaders. This can be achieved by several means. In one arrangement, a list of sensitive classes can be defined, and for each class which appears on that list, permitting only a single class definition of that class name to be loaded by the JVM, preferably by a designated class loader.

In another arrangement, Java annotation features can be used as an identification means to mark a Java API class as a sensitive class. Various alternative arrangements of lists, content indexes, annotations, and compilation attributes may be used in order to identify to the JVM those sensitive classes which are to be loaded singularly by a designated or predetermined class loader, and those non-sensitive classes which are to be loaded plurally by multiple class loaders. The JVM and/or related Java API classes are modified to examine or consult such lists, content indexes, annotations or other compilation attributes when loading Java API classes in order to determine the correct class loading action for a given Java API class. Appendix C shows one such example of a list which may be used to identify sensitive classes, encapsulated in the method getSensitiveClassList( ).

Alternatively, Appendix D shows an example of Java annotation features being used to identify java.lang.RuntimeException as a sensitive class by the use of a special "@SensitiveClass" annotation for that purpose (see line 41).

There is no intended limitation that sensitive classes and non-sensitive classes are loaded by unique class loaders. In a preferred embodiment of the present invention, a bootstrap class loader is designated to load and define sensitive classes, but that same bootstrap class loader can also be used to load and define non-sensitive classes. Preferably a bootstrap class loader is designated for loading and defining sensitive classes but also loads and defines non-sensitive classes as well, and one or more application class loaders load and define non-sensitive classes of their own for each unique application domain.

In yet other arrangements, an application class loader is designated in place of a bootstrap class loader to load and define sensitive classes, such as is desirable when a JVM does not have a bootstrap class loader or the bootstrap class loader is not able to be modified. Regardless of which precise arrangement is employed, the JVM and/or related Java API classes are modified to load and define, per executing JVM instance, at most one class definition per sensitive class, and multiple class definitions per non-sensitive class.

FIG. 8 shows one embodiment of a class and classloader arrangement of the present invention, where sensitive Java API classes are loaded singularly by a bootstrap class loader, and where non-sensitive Java API classes are loaded plurally either by the bootstrap class loader and/or by various application class loaders. There are multiple regular classes for each of the multiple application programs. FIG. 9 shows the same arrangement as FIG. 8 but after all Java API classes have been loaded, where the sensitive API classes are shown to be loaded only once by the bootstrap class loader, and where the non-sensitive API classes are shown to be loaded 4 times, once for each of the three concurrently hosted application program and once for the bootstrap class loader.

As a result of having a single class definition for sensitive API classes, special modification is preferably provided to ensure they do not succumb to a similar denial-of-service risk as described for the "shared base classes" of U.S. Pat. No. 6,931,544 above. This can be achieved by a further modification to the JVM and/or related Java API classes, where the source-code of some or all of the sensitive API classes is modified to not use synchronized method modifiers, or is modified to not use synchronization statements of the "this" instance of non-static methods, or is modified to not use synchronization statements of the java.lang.Class instance of the declaring class, or is modified in some combination of these three modifications.

Appendix E shows an example source code of a synchronized method of a sensitive API class from the OpenJDK Java 6 source code, that is to be modified in accordance with the third abovementioned modification of the preferred embodiment of the present invention. Here the initCause (Throwable cause) method of java.lang.Throwable class is shown in a before modification (original) arrangement. In the before modification arrangement of Appendix E, the initCause(Throwable cause) method is a synchronized instance method which is sought to be modified to remove the synchronized method modifier whilst preserving correct thread-safe operation as required. To achieve this, the source-code of the initCause(Throwable cause) method is modified in two ways. Firstly a private "lock variable" instance field is added to the java.lang.Throwable class definition. Secondly the synchronized method modifier of the initCause(Throwable cause) method is removed and a synchronization statement is inserted that uses the added "lock variable" instead of the "this" variable that was originally used. Appendix F shows the "diff output" using the GNU DIFF tool generated between the original complete java.lang.Throwable.java source code of Appendix E, and an after-modification source code file where the initCause (Throwable cause) method has been modified in accordance with the abovementioned third modification of the preferred embodiment of the present invention.

While Appendix F only shows the modification of the initCause(Throwable cause) method of the java.lang.Throwable class, in most instances it is desirable that several other methods of the java.lang.Throwable class be modified similarly, including the fillInStackTrace( ) method, the getOurStackTrace( ) method, and the writeObject (java.io.ObjectOutputStream s) method.

In accordance with a first aspect of the present invention there is disclosed a modified JVM for hosting multiple Java applications within a single executing instance of said modified JVM, wherein said JVM is modified to permit multiple class definitions of at least some of the Java API classes, wherein said modified JVM loads one class definition of a first set of Java API classes, and wherein said modified JVM loads two or more class definitions of a second set of Java API classes not including any of said first set classes.

Preferably, said first set classes are loaded by a bootstrap class loader.

Preferably at most one class definition of said first set classes is loaded by the JVM.

Preferably the class loader used to load the said first set of API classes also loads one or more class definitions of said second set of API classes.

Preferably said modified JVM includes modified Java API classes, wherein said modified Java API classes are modified to permit multiple class definitions of at least some of the Java API classes.

In accordance with a second aspect of the present invention there is disclosed a modified JVM for hosting multiple Java applications within a single executing instance of said JVM, wherein said JVM uses Java API classes modified to permit multiple class definitions of at least some of the Java API classes, and wherein said modified JVM loads one class definition of a first set of Java API classes, and wherein said modified JVM loads two or more class definitions of a second set of Java API classes, not including any of said first set of API classes.

Preferably the abovementioned loading of each second and subsequent class definition of said second set of API classes utilizes one or more application class loaders.

Preferably the said first set of API classes is identified in a list or other record.

Alternatively, the said first set of API classes is identified with a Java annotation type intended for that purpose.

Preferably some or all of the said first set of API classes are modified so as to not use synchronized method modifiers, or synchronization statements of instance types of the declaring class, or the java.lang.Class type of the declaring class.

Preferably said first set of API classes includes one or more of java.lang.Object, java.lang.Class, java.lang.Throwble, or java.lang.String.

In addition there is disclosed a method of modifying a JVM to allow multiple Java application programs to run contemporaneously on a single JVM running on a single operating system, said method comprising the steps of:

categorizing each API class of said Java application programs into either a sensitive API class category or a non-sensitive API class category, providing a single bootstrap class loader or equivalent and providing an application class loader corresponding to each said application program, and loading said non-sensitive API classes via said application class loaders a number of times corresponding to the number of said application programs, but loading said sensitive API classes only once via said bootstrap class loader or equivalent.

The foregoing describes only some embodiments of the present invention and modifications, obvious to those skilled in the computing arts, can be made thereto without departing from the scope of the present invention.

The term "comprising" (and its grammatical variations) as used herein is used in the inclusive sense of "including" or "having" and not in the exclusive sense of "consisting only of".

[0085] Appendix A

227 /**

```
228    * Attempts to locate a driver that understands the given URL.
229    * The <code>DriverManager</code> attempts to select an appropriate driver from
230    * the set of registered JDBC drivers.
231    *
232    * @param url a database URL of the form
233    *     <code>jdbc:<em>subprotocol</em>:<em>subname</em></code>
234    * @return a <code>Driver</code> object representing a driver
235    * that can connect to the given URL
236    * @exception SQLException if a database access error occurs
237    */
238    public static Driver getDriver(String url)
239       throws SQLException {
240       java.util.Vector drivers = null;
241
242       println("DriverManager.getDriver(\"" + url + "\")");
243
244       if (!initialized) {
245          initialize();
246       }
247
248       synchronized (DriverManager.class){
249          // use the read copy of the drivers vector
250          drivers = readDrivers;
251       }
252
253       // Gets the classloader of the code that called this method, may
254       // be null.
255       ClassLoader callerCL = DriverManager.getCallerClassLoader();
256
257       // Walk through the loaded drivers attempting to locate someone
258       // who understands the given URL.
259       for (int i = 0; i < drivers.size(); i++) {
```

[0086] Appendix B java.lang.Object
java.lang.Class
java.lang.Throwable
java.lang.String
java.lang.Boolean
java.lang.Byte
java.lang.Character java.lang.Short
java.lang.Integer
java.lang.Float
java.lang.Long
java.lang.Double
java.lang.Void
java.lang.Enum
java.lang.SecurityException
java.lang.RuntimeException
java.lang.Error
java.lang.Comparable
java.lang.annotation.Annotation
java.lang.reflect.Type
java.io.IOException

[0087] Appendix C

```
8    // Return a list of sensitive classes for this JVM
9    public String[] getSensitiveClassList() {
10       String[] sensitiveClassList = new String[] {
11          "java.lang.Object",
12          "java.lang.Class",
13          "java.lang.Throwable",
14          "java.lang.String",
15          "java.lang.Boolean",
16          "java.lang.Byte",
17          "java.lang.Character",
18          "java.lang.Short",
19          "java.lang.Integer",
20          "java.lang.Float",
21          "java.lang.Long",
22          "java.lang.Double",
23          "java.lang.Enum",
24          "java.lang.SecurityException",
25          "java.lang.RuntimeException",
26          "java.lang.Error",
27          "java.lang.Comparable",
28          "java.lang.annotation.Annotation",
29          "java.lang.reflect.Type",
30          "java.io.IOException" };
31       return sensitiveClassList;
32    }
```

[0088]   Appendix D

```
26 package java.lang;
27
28 /**
29  * <code>RuntimeException</code> is the superclass of those
30  * exceptions that can be thrown during the normal operation of the
31  * Java Virtual Machine.
32  * <p>
33  * A method is not required to declare in its <code>throws</code>
34  * clause any subclasses of <code>RuntimeException</code> that might
35  * be thrown during the execution of the method but not caught.
36  *
37  *
38  * @author  Frank Yellin
39  * @since   JDK1.0
40  */
41 @SensitiveClass
42 public class RuntimeException extends Exception {
43     static final long serialVersionUID = -7034897190745766939L;
44
45     /** Constructs a new runtime exception with <code>null</code> as its
46      * detail message.  The cause is not initialized, and may subsequently be
47      * initialized by a call to {@link #initCause}.
48      */
49     public RuntimeException() {
50         super();
51     }
52
53     /** Constructs a new runtime exception with the specified detail message.
54      * The cause is not initialized, and may subsequently be initialized by a
55      * call to {@link #initCause}.
56      *
57      * @param  message   the detail message. The detail message is saved for
58      *         later retrieval by the {@link #getMessage()} method.
59      */
60     public RuntimeException(String message) {
61         super(message);
62     }
63
64     /**
```

```
65    * Constructs a new runtime exception with the specified detail message and
66    * cause.  <p>Note that the detail message associated with
67    * <code>cause</code> is <i>not</i> automatically incorporated in
68    * this runtime exception's detail message.
69    *
70    * @param  message the detail message (which is saved for later retrieval
71    *         by the {@link #getMessage()} method).
72    * @param  cause the cause (which is saved for later retrieval by the
73    *         {@link #getCause()} method).  (A <tt>null</tt> value is
74    *         permitted, and indicates that the cause is nonexistent or
75    *         unknown.)
76    * @since  1.4
77    */
78   public RuntimeException(String message, Throwable cause) {
79       super(message, cause);
80   }
81
82   /** Constructs a new runtime exception with the specified cause and a
83    * detail message of <tt>(cause==null ? null : cause.toString())</tt>
84    * (which typically contains the class and detail message of
85    * <tt>cause</tt>).  This constructor is useful for runtime exceptions
86    * that are little more than wrappers for other throwables.
87    *
88    * @param  cause the cause (which is saved for later retrieval by the
89    *         {@link #getCause()} method).  (A <tt>null</tt> value is
90    *         permitted, and indicates that the cause is nonexistent or
91    *         unknown.)
92    * @since  1.4
93    */
94   public RuntimeException(Throwable cause) {
95       super(cause);
96   }
97 }
```

[0089] Appendix E

```
311  /**
312   * Initializes the <i>cause</i> of this throwable to the specified value.
313   * (The cause is the throwable that caused this throwable to get thrown.)
314   *
315   * <p>This method can be called at most once.  It is generally called from
316   * within the constructor, or immediately after creating the
317   * throwable.  If this throwable was created
318   * with {@link #Throwable(Throwable)} or
319   * {@link #Throwable(String,Throwable)}, this method cannot be called
320   * even once.
321   *
322   * @param  cause the cause (which is saved for later retrieval by the
323   *         {@link #getCause()} method).  (A <tt>null</tt> value is
324   *         permitted, and indicates that the cause is nonexistent or
325   *         unknown.)
326   * @return  a reference to this <code>Throwable</code> instance.
327   * @throws IllegalArgumentException if <code>cause</code> is this
328   *         throwable.  (A throwable cannot be its own cause.)
329   * @throws IllegalStateException if this throwable was
330   *         created with {@link #Throwable(Throwable)} or
331   *         {@link #Throwable(String,Throwable)}, or this method has already
332   *         been called on this throwable.
333   * @since  1.4
334   */
335  public synchronized Throwable initCause(Throwable cause) {
336      if (this.cause != this)
337          throw new IllegalStateException("Can't overwrite cause");
338      if (cause == this)
339          throw new IllegalArgumentException("Self-causation not permitted");
340      this.cause = cause;
341      return this;
342  }
```

[0090] Appendix F

```
150a151,156
>   /**
>    * Private "lock variable" to be used in place of the synchronized method
>    * modifier in the initCause(Throwable cause) method.
>    */
>   private transient Object LOCK_VARIABLE = new Object();
>
335,342c341,350
<   public synchronized Throwable initCause(Throwable cause) {
<     if (this.cause != this)
<       throw new IllegalStateException("Can't overwrite cause");
<     if (cause == this)
<       throw new IllegalArgumentException("Self-causation not permitted");
<     this.cause = cause;
<     return this;
<   }
---
>   public Throwable initCause(Throwable cause) {
>     synchronized( LOCK_VARIABLE ) {
>       if (this.cause != this)
>         throw new IllegalStateException("Can't overwrite cause");
>       if (cause == this)
>         throw new IllegalArgumentException("Self-causation not permitted");
>       this.cause = cause;
>       return this;
>     }
>   }
```

The invention claimed is:

1. A shared server infrastructure comprising a single executing modified Virtual Machine which hosts multiple applications thereon,
wherein the single executing modified Virtual Machine is modified by loading a subset of a plurality of classes of an Application Programming Interface (API) for each application of said plurality of applications, wherein said subset does not include at least one class from said plurality of classes of said API.

2. The shared server infrastructure as claimed in claim 1 and operable in a computer language known as .Net.

3. The shared server infrastructure as claimed in claim 1 and operable in a computer language known as Java.

4. The shared server infrastructure as claimed in claim 1 wherein said plurality of classes are categorized into a first set of API classes and a second set of API classes, with said second set of API classes not including any of said first set of API classes, and wherein said subset includes only said second set of API classes.

5. The shared server infrastructure as claimed in claim 4 wherein each of said hosted applications has regular application classes, and wherein for each of said hosted applications at least one class definition of said regular application classes is loaded.

6. The shared server infrastructure as claimed in claim 4 wherein said first set of API classes is loaded by a bootstrap class loader or a primordial class loader.

7. A method of implementing a Virtual Machine to host a plurality of independent applications within a single executing Virtual Machine instance, the method comprising:
defining a group of Application Programming Interface (API) classes and a first subset of the group of API classes, wherein the first subset does not include at least one API class from the group of API classes;
modifying a Virtual Machine to support loading multiple class definitions of an API class from the first subset; and
loading the modified Virtual Machine with a class definition of the API class from the first subset for each one of the plurality of independent applications.

8. The method of claim 7, further comprising modifying the Virtual Machine to permit loading of only one class definition of an API class from a second subset of the group of API classes.

9. The method of claim 8, wherein the first subset consists of non-sensitive Java API classes, and the second subset comprises sensitive Java API classes.

10. The method of claim 7, wherein modifying the Virtual Machine includes a step selected from the group consisting of (a) removing existing check conditions which disallow loading multiple class definitions of API classes; and (b) suppressing error or exception actions which occur when attempting to load multiple class definitions of API classes.

11. The method of claim 7, wherein the loading step is performed by a bootstrap class loader or a primordial class loader.

12. A shared server infrastructure comprising:
a single executing modified Virtual Machine;
a plurality of applications hosted within the single executing modified Virtual Machine; and
a plurality of classes of an Application Programming Interface (API) loaded on the single executing modified Virtual Machine,
wherein the single executing modified Virtual Machine is loaded with a subset of the plurality of classes for each one of the plurality of applications, the subset not including at least one class from the plurality of classes.

13. The shared server infrastructure of claim 12, wherein only a single instance of the at least one class not included in the subset is loaded on the single executing modified Virtual Machine.

14. The shared server infrastructure of claim 13, wherein the subset consists of non-sensitive Java API classes, and the at least one class not included in the subset comprises sensitive Java API classes.

15. The shared server infrastructure of claim 12, wherein said subset is loaded by a bootstrap class loader or a primordial class loader.

* * * * *